(12) United States Patent
Ting et al.

(10) Patent No.: US 9,287,817 B2
(45) Date of Patent: Mar. 15, 2016

(54) CONTROL SYSTEM

(75) Inventors: Chia-Min Ting, Taoyuan County (TW); Shir-Shing Chao, Taipei (TW); Hsin-Hung Chou, Changhua County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 1153 days.

(21) Appl. No.: 13/040,173

(22) Filed: Mar. 3, 2011

(65) Prior Publication Data

US 2012/0153885 A1  Jun. 21, 2012

(30) Foreign Application Priority Data

Dec. 20, 2010  (TW) .............................. 99144820 A

(51) Int. Cl.
*G05B 11/42* (2006.01)
*H02P 23/00* (2006.01)

(52) U.S. Cl.
CPC .................................. *H02P 23/0077* (2013.01)

(58) Field of Classification Search
USPC ..................................................... 700/45, 44
See application file for complete search history.

(56) References Cited

U.S. PATENT DOCUMENTS

| | | | |
|---|---|---|---|
| 4,616,162 A | 10/1986 | Radomski | |
| 4,691,116 A | 9/1987 | Kiyono et al. | |
| 5,596,512 A | 1/1997 | Wong et al. | |
| 5,912,539 A | 6/1999 | Sugitani et al. | |

(Continued)

FOREIGN PATENT DOCUMENTS

| | | |
|---|---|---|
| CN | 1523465 A | 8/2004 |
| CN | 1761920 A | 4/2006 |

(Continued)

OTHER PUBLICATIONS

Ohm, "Analysis of PID and PDF Compensators for Motion Control Systems" Conference Record of the 1994 IEEE Industry Applications Society Annual Meeting, vol. 3. Oct. 2-6, 1994. pp. 1923-1929.*

(Continued)

*Primary Examiner* — Mohammad Ali
*Assistant Examiner* — Emilio J Saavedra
(74) *Attorney, Agent, or Firm* — Locke Lord LLP; Tim Tingkang Xia, Esq.

(57) ABSTRACT

A control system may be switched between a Pseudo-Derivative Feedforward (PDFF) control manner and a Proportional Integral (PI) control manner. The control system includes a first operational element, a second operational element, a feedback proportion controller, an integrator, and a feedforward proportion controller. The first operational element and the second operational element are used to perform calculation of addition or subtraction on an input signal, a feedback signal, and a feedforward signal. The integrator generates an integral signal. The feedback proportion controller generates a feedback proportion signal according to a first feedback gain or a second feedback gain. The feedforward proportion controller generates a feedforward proportion signal according to a first feedforward gain or a second feedforward gain. The control system may be switched among the different control manners through selection among the first feedback gain, the second feedback gain, the first feedforward gain, and the second feedforward gain.

12 Claims, 10 Drawing Sheets

(56) References Cited

U.S. PATENT DOCUMENTS

| | | |
|---|---|---|
| 5,956,196 A | 9/1999 | Hull et al. |
| 6,064,776 A | 5/2000 | Kikuchi et al. |
| 6,591,808 B2 | 7/2003 | Lin et al. |
| 7,113,834 B2 | 9/2006 | Wojsznis et al. |
| 7,411,692 B2 | 8/2008 | Ferlitsch |
| 7,437,237 B2 | 10/2008 | Murakado |
| 7,531,974 B2 | 5/2009 | Ohtsuka et al. |
| 7,805,207 B2 | 9/2010 | El Rifai |
| 2008/0231736 A1* | 9/2008 | Solhusvik .................... 348/294 |

FOREIGN PATENT DOCUMENTS

| | | |
|---|---|---|
| CN | 101751044 A | 6/2010 |
| KR | 20030020781 A | 3/2003 |

OTHER PUBLICATIONS

Ellis, "PDFF: An evaluation of a velocity loop control method" Proceedings of the International Intelligent Motion Conference. 1999. pp. 1-6.*

Khuakoonrat et al., "I-PDA Incorporating FFC Control System Designed by CDM". SICE Annual Conference in Fukui, Aug. 4-6, 2003, Fukui University, Japan pp. 2250-54.*

Hung-Lung Tseng et al., The Study and Design of an Intelligent Elevator Control System, National Central University Library Electronic Theses & Dissertations System, Jul. 2001, National Digital Library of Theses and Dissertations in Taiwan, Taiwan, R.O.C.

Intellectual Property Office, Ministry of Economic Affairs, R.O.C., "Office Action", Jun. 26, 2013, Taiwan.

Cheng S, et al., Dual Robust Controller Design for High Power AC Servo drive, ECSIS Symposium on Learning and Adaptive Behaviors for Robotic Systems, Aug. 2008, pp. 97-102, Edinburgh.

Ellis G. et al., PDFF: An evaluation of a velocity loop control method, PCIM-Europe, 1999.

Ohm D.Y., et al., PID and PDFF Compensators for Motion Control, IEEE IAS Annual Meeting, 1994, pp. 1-12.

Liao, Fu Cheng et al., Unified Handling of Optimal Preview Servo Systems and Optimal Review FF Compensating Systems, ACTA Automatica Sinica, 1998, p. 640-646, vol. 24, No. 5.

Wu, Jing et al., Choice and Realization of Control Strategies for a Full Digital DC Servo System, Drive and Control, 2004, p. 23-28, No. 7.

State Intellectual Property Office of the People's Republic of China, "Office Action", China, Dec. 30, 2013.

* cited by examiner

US 9,287,817 B2

CONTROL SYSTEM

CROSS-REFERENCE TO RELATED APPLICATIONS

This non-provisional application claims priority under 35 U.S.C. §119(a) on Patent Application No. 099144820 filed in Taiwan, R.O.C. on Dec. 20, 2010, the entire contents of which are hereby incorporated by reference.

BACKGROUND OF THE INVENTION

1. Field of Invention

The present invention relates to a control system, and more particularly to a control system capable of being switched among control manners.

2. Related Art

With the development of science, control of a servo motor plays an important role in various industries. Currently, a common control method of the servo motor mainly adopts Proportional Integral (PI) control or Proportional Integral Derivative (PID) control.

However, the conventional PI control or the conventional PID control faces some problems in practical applications. For example, if the PI control or the PID control only uses a single parameter, it is difficult for the control manner to adapt to the change of the system with the time or environment, and thus a robustness problem occurs. That is to say, the pure PI control or PID control can not enable the system to give the optimal output performance.

In another aspect, in the PI control, if a response speed of the system is increased, overshooting of the system occurs to reduce precision of the system. On the contrary, if the overshooting is avoided, the response speed of the system is reduced.

To sum up, the current control system of the servo motor can neither be adjusted according to the change of environment or time, nor obtain an appropriate balance point between the response speed and the overshooting of the system.

SUMMARY OF THE INVENTION

Accordingly, the present invention provides a control system, which comprises a first operational element, a feedback proportion controller, an integrator, a feedforward proportion controller, and a second operational element. The control system is used to receive an input signal and a feedback signal, and generate an output signal.

The first operational element is used to receive the input signal and the feedback signal, and generate a first operation signal.

The second operational element is used to receive a feedforward proportion signal, a feedback proportion signal, and an integral signal, and generate the output signal.

The feedback proportion controller is used to receive the feedback signal, and selectively generate the feedback proportion signal according to a first feedback gain or a second feedback gain.

The integrator is used to receive the first operation signal and generate the integral signal.

The feedforward proportion controller is used to receive the input signal, and selectively generate the feedforward proportion signal according to a first feedforward gain or a second feedforward gain.

The integrator generates the integral signal according to a first integral gain or a second integral gain.

The present invention puts forward several different embodiments.

In one embodiment, the first feedback gain is not equal to the first feedforward gain, and the second feedback gain is equal to the second feedforward gain. In another embodiment, the first feedback gain is not equal to the first feedforward gain, and the second feedforward gain is equal to 0. In still another embodiment, the first feedback gain is not equal to the first feedforward gain, the second feedback gain is equal to the second feedforward gain, and the second integral gain is equal to 0. In yet another embodiment, the first feedback gain is equal to the first feedforward gain, the second feedback gain is equal to the second feedforward gain, and the second integral gain is equal to 0.

The control system of the present invention may be automatically switched among a plurality of different control methods (such as Pseudo-Derivative Feedforward (PDFF), PI, Pseudo-Derivative Feedback (PDF), or Proportional (P)), so as to provide a high-efficiency control manner.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The detailed features and advantages of the present invention will be described in detail in the following embodiments. Persons skilled in the arts can easily understand and implement the content of the present invention. Furthermore, the relative objectives and advantages of the present invention are apparent to those skilled in the arts with reference to the content disclosed in the specification, claims, and drawings.

Figure 1:
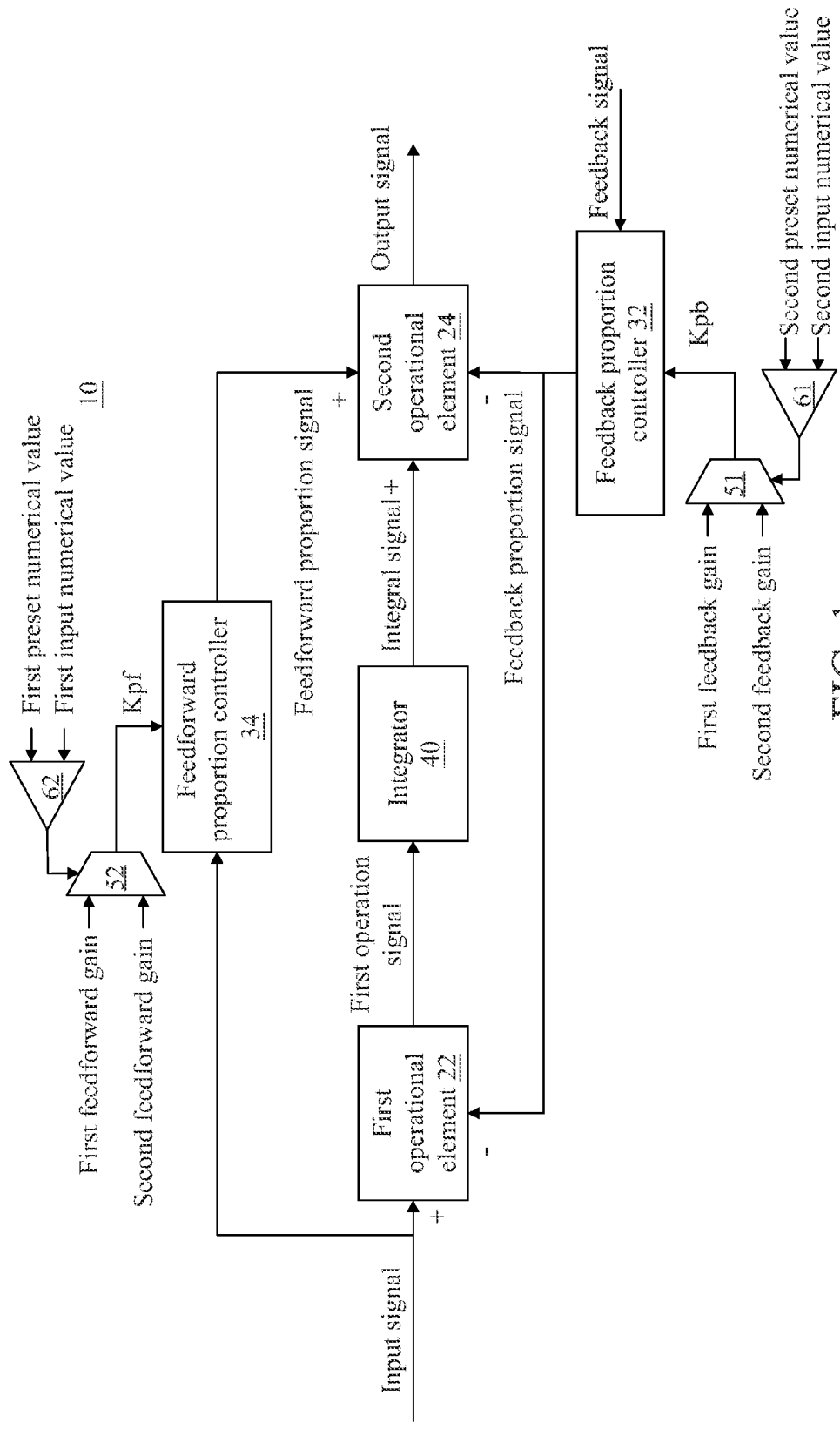
FIG. 1 is a block diagram of a system according to a first embodiment of the present invention.

Referring to FIG. 1, it is a block diagram of a system according to a first embodiment of the present invention.

A control system 10 according to the present invention is used to receive an input signal and a feedback signal, and generate an output signal. The output signal may be transmitted to a servo motor. The control system 10 comprises a first operational element 22, a second operational element 24, a feedback proportion controller 32, a feedforward proportion controller 34, and an integrator 40.

The first operational element 22 is used to receive the input signal and the feedback signal, and generate a first operation signal. The first operational element 22 may be, but not limited to, a subtractor, and performs subtraction on the input signal and the feedback signal, so as to generate the first operation signal.

The second operational element 24 is used to receive a feedforward proportion signal, a feedback proportion signal, and an integral signal, and generate the output signal. The second operational element 24 may comprise an adder and a subtractor. The second operational element 24 performs addition on the feedforward proportion signal and the integral signal, and then performs subtraction on an added result and the feedback proportion signal, so as to generate the output signal.

The feedback proportion controller 32 is used to receive the feedback signal, and multiply the feedback signal by a gain Kpb, so as to generate a feedback proportion signal. The feedback proportion controller 32 transmits the feedback proportion signal to the second operational element 24. The gain Kpb could be selected from the first feedback gain and the second feedback gain.

The gain Kpb received by the feedback proportion controller 32 may be output by a first multiplexer 51. The first multiplexer 51 receives the first feedback gain and the second feedback gain, and selectively outputs one of the first feedback gain and the second feedback gain according to a first switching signal. The first switching signal is generated by a first comparator 61. The first comparator 61 generates the first switching signal according to a first preset numerical value and a first input numerical value. Furthermore, for example, when the first input numerical value is smaller than the first preset numerical value, the first comparator 61 outputs the first switching signal of a first type (for example, "logic 0") to the first multiplexer 51. The first multiplexer 51 outputs the first feedback gain according to the first switching signal of the first type. When the first input numerical value is greater than the first preset numerical value, the first comparator 61 outputs the first switching signal of a second type (for example, "logic 1") to the first multiplexer 51. The first multiplexer 51 outputs the second feedback gain according to the first switching signal of the second type.

The first input numerical value may be a rotation torque or a rotation speed of a controlled device (such as the servo motor) sensed by a sensing device or a numerical value set by a user through calculation. The first preset numerical value may be a numerical value set by the user.

The feedback proportion controller 34 is used to receive the input signal, and multiply the feedback signal by a gain Kpf, so as to generate the feedforward proportion signal. The feedback proportion controller 34 transmits the feedforward proportion signal to the first operational element 22 and the second operational element 24. The gain Kpf may be selected from the first feedforward gain and the second feedforward gain.

The gain Kpf received by the feedforward proportion controller 34 may be output by a second multiplexer 52. The second multiplexer 52 receives the first feedforward gain and the second feedforward gain, and selectively outputs one of the first feedforward gain and the second feedforward gain according to a second switching signal. The second switching signal is generated by a second comparator 62. The second comparator 62 generates the second switching signal according to a second preset numerical value and a second input numerical value. Furthermore, for example, when the second input numerical value is smaller than the second preset numerical value, the second comparator 62 outputs the second switching signal of a first type (for example, "logic 0") to the second multiplexer 52. The second multiplexer 52 outputs the first feedforward gain according to the second switching signal of the first type. When the second input numerical value is greater than the second preset numerical value, the second comparator 62 outputs the second switching signal of a second type (for example, "logic 1") to the second multiplexer 52. The second multiplexer 52 outputs the second feedforward gain according to the second switching signal of the second type.

The second input numerical value has a property being similar to the first input numerical value, and may be a numerical value sensed by the sensing device. The first preset numerical value also has a property being similar to the second preset numerical value, and may be a numerical value set by the user.

The integrator 40 is connected between the first operational element 22 and the second operational element 24. The integrator 40 is used to receive the first operation signal of the first operational element 22, perform the integral on the first operation signal to generate an integral signal, and transmit the integral signal to the second operational element 24.

Figure 2:
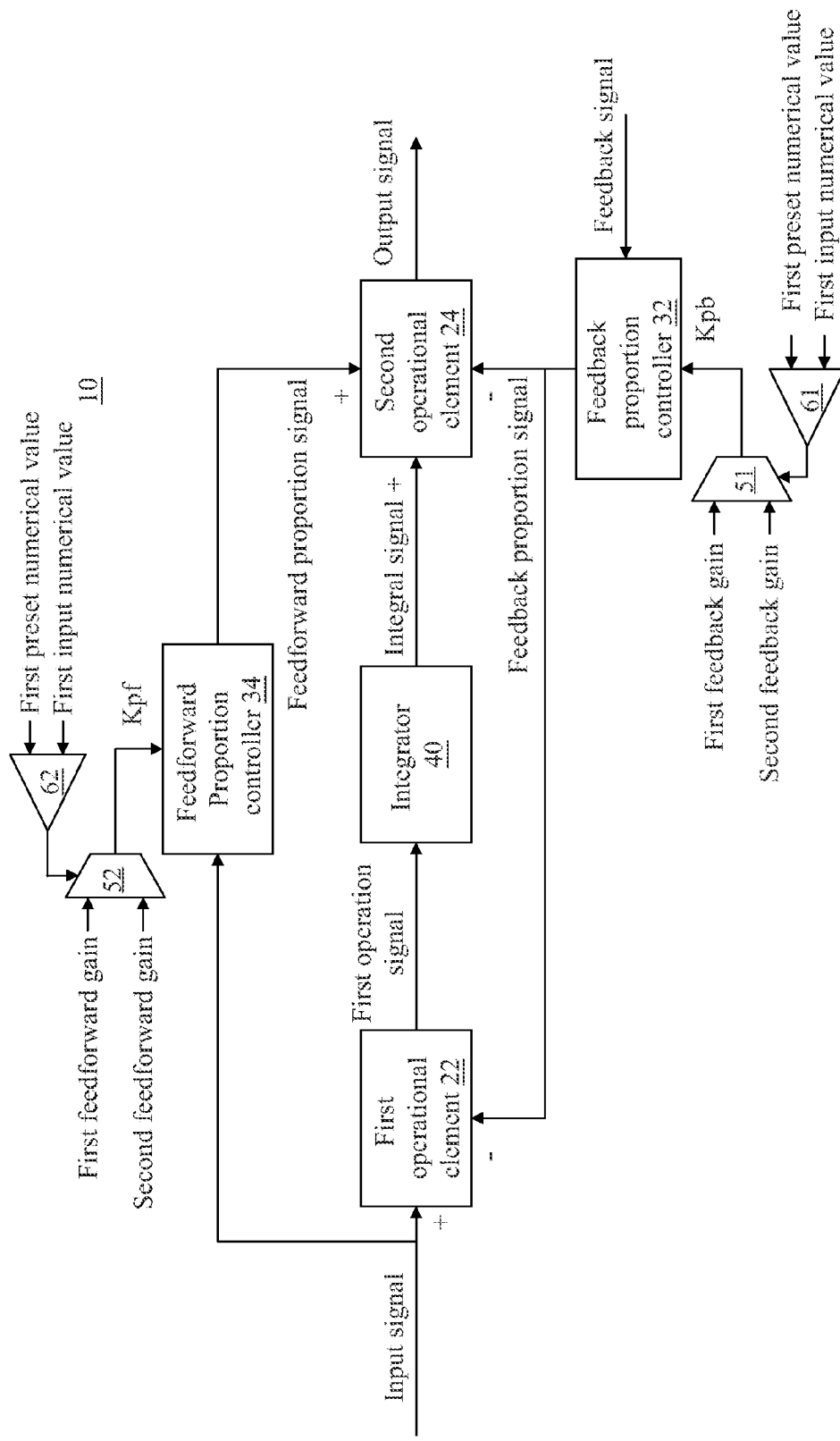
FIG. 2 is a block diagram of a system according to a second embodiment of the present invention.

The first multiplexer 51 and the second multiplexer 52 may be respectively controlled by two comparators (the first comparator 61 and the second comparator 62), and may be controlled by the same comparator (the first comparator 61). Referring to FIG. 2, it is a block diagram of a system according to a second embodiment of the present invention. In this embodiment, the first multiplexer 51 and the second multiplexer 52 may be switched at the same time. The first multiplexer 51 and the second multiplexer 52 may output the first feedforward gain and the first feedback gain at the same time or the second feedforward gain and the second feedback gain at the same time.

The control system 10 according to FIG. 1 or FIG. 2 may be switched between a PDFF control manner and a PI control manner, or between the PDFF control manner and a PDF control manner. An operating manner and a principle of switching the control manners are illustrated in the following.

Figure 3:
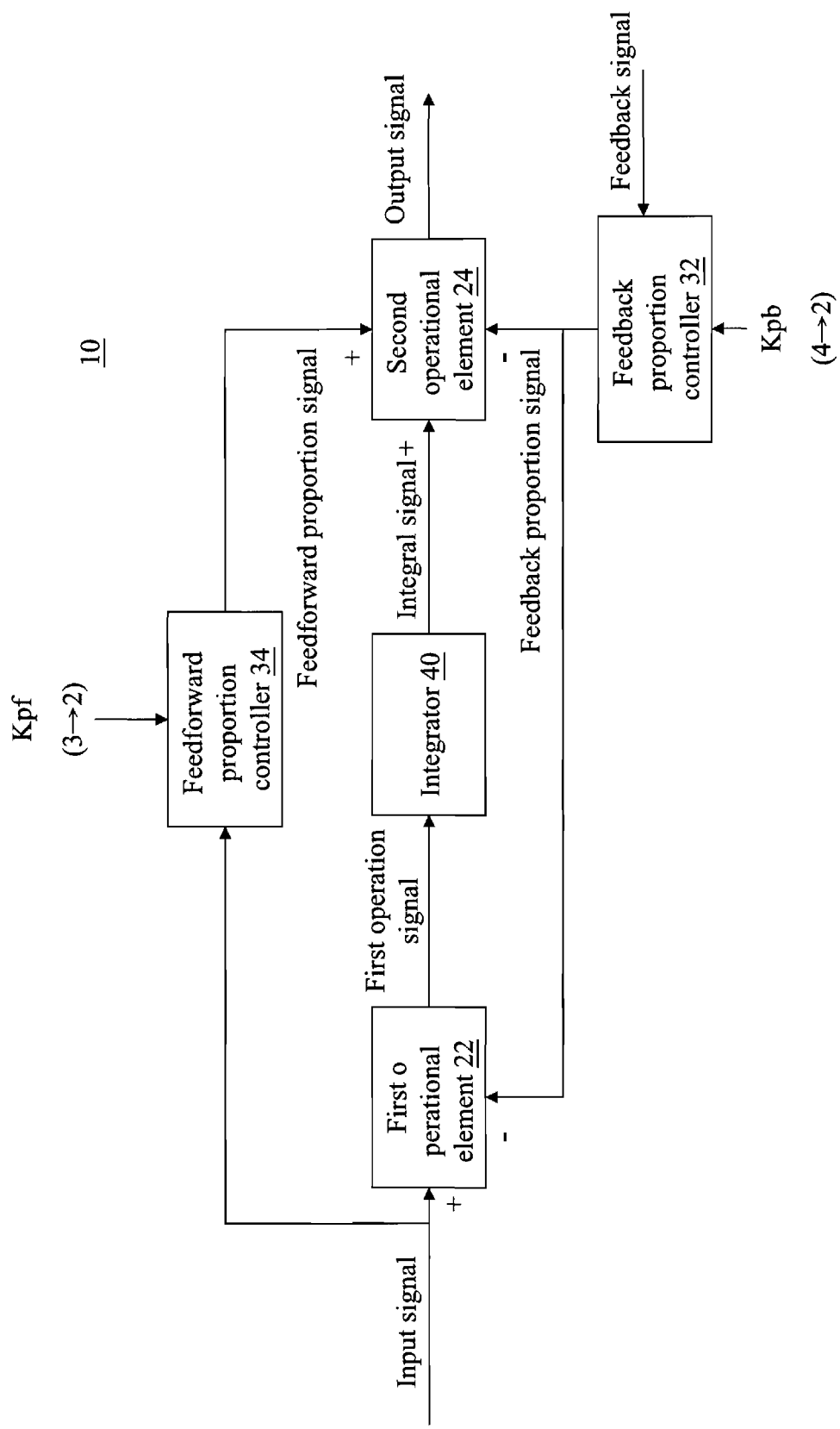
FIG. 3 is a block diagram of a system according to a third embodiment of the present invention.

Referring to FIG. 3, it is a block diagram of a system according to a third embodiment of the present invention. In this embodiment, the first feedback gain is not equal to the first feedforward gain, and the second feedback gain is equal to the second feedforward gain. For example, the first feedback gain is "4", the second feedback gain is "2", the first feedforward gain is "3", and the second feedforward gain is "2".

When the gain Kpb is "4" (the first feedback gain) and the gain Kpf is "3" (the first feedforward gain), the control system 10 may perform a PDFF control. When the gain Kpb is "2" (the second feedback gain) and the gain Kpf is "2" (a second feedforward gain), the control system 10 may perform a PI control. Based on the foregoing descriptions, the first feedback gain/the second feedback gain and the first feedforward gain/the second feedforward gain are switched by the first multiplexer 51 and the second multiplexer 52. Therefore, the control system 10 may be switched between the PDFF control and the PI control.

Figure 4:
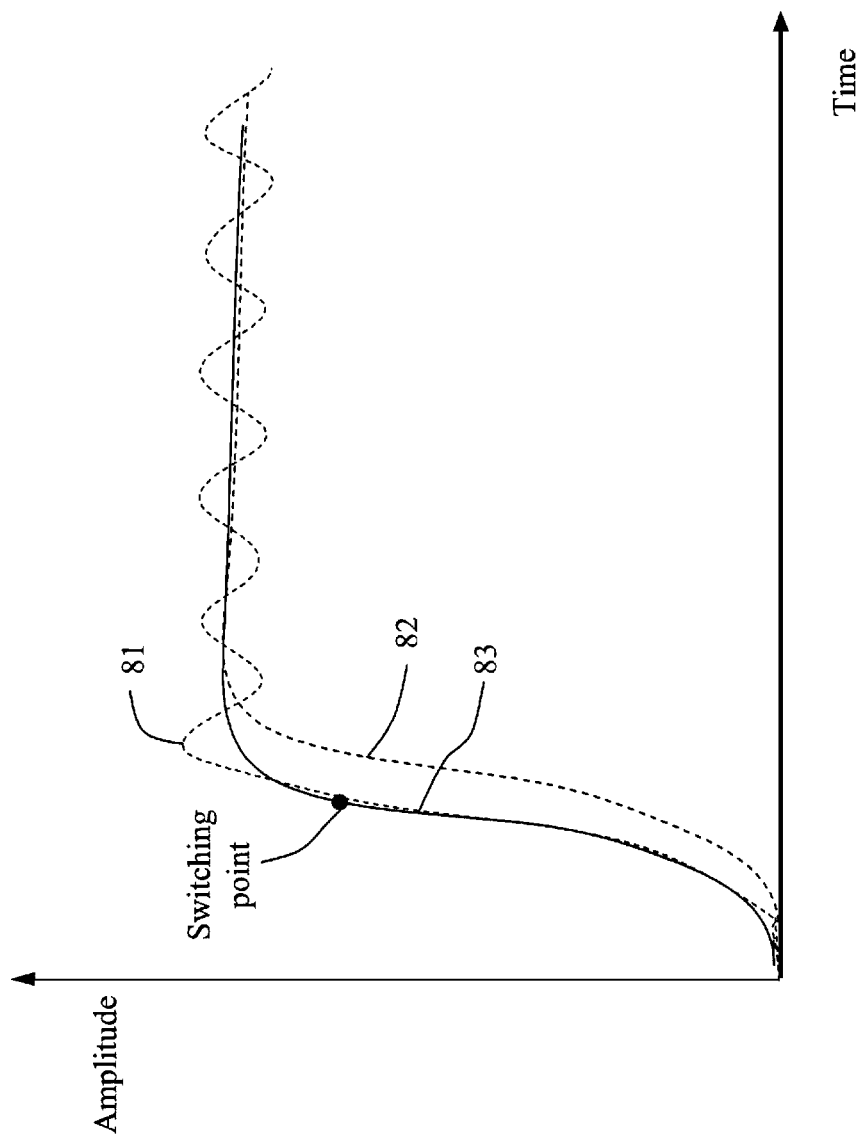
FIG. 4 is a response oscillogram of the third embodiment of the present invention.

Referring to FIG. 4, it is a response oscillogram of the third embodiment of the present invention. In this figure, if the control system 10 entirely uses the PI control, a response oscillogram of the output signal generated by the control system 10 is a dot line segment 81. If the control system 10 entirely uses the PDFF control, the response oscillogram of the output signal generated by the control system 10 is a dot line segment 82. It can be known from the figure that when the PI control is used, the response time is fast, but the output signal generates overshooting. In another aspect, when the PDFF control is used, the overshooting is not generated, but the response time is slow. Therefore, on the forepart of the control, the PI control is used and the PDFF control is switched to be used at a switching point through the switching of the gain Kpb and gain Kpf. The response oscillogram corresponding to the mixed PI/PDFF control manner is a solid line segment 83. It can be known from the figure that the mixed PI/PDFF control manner has the fast response time but does not have the problem of the overshooting.

Figure 5:
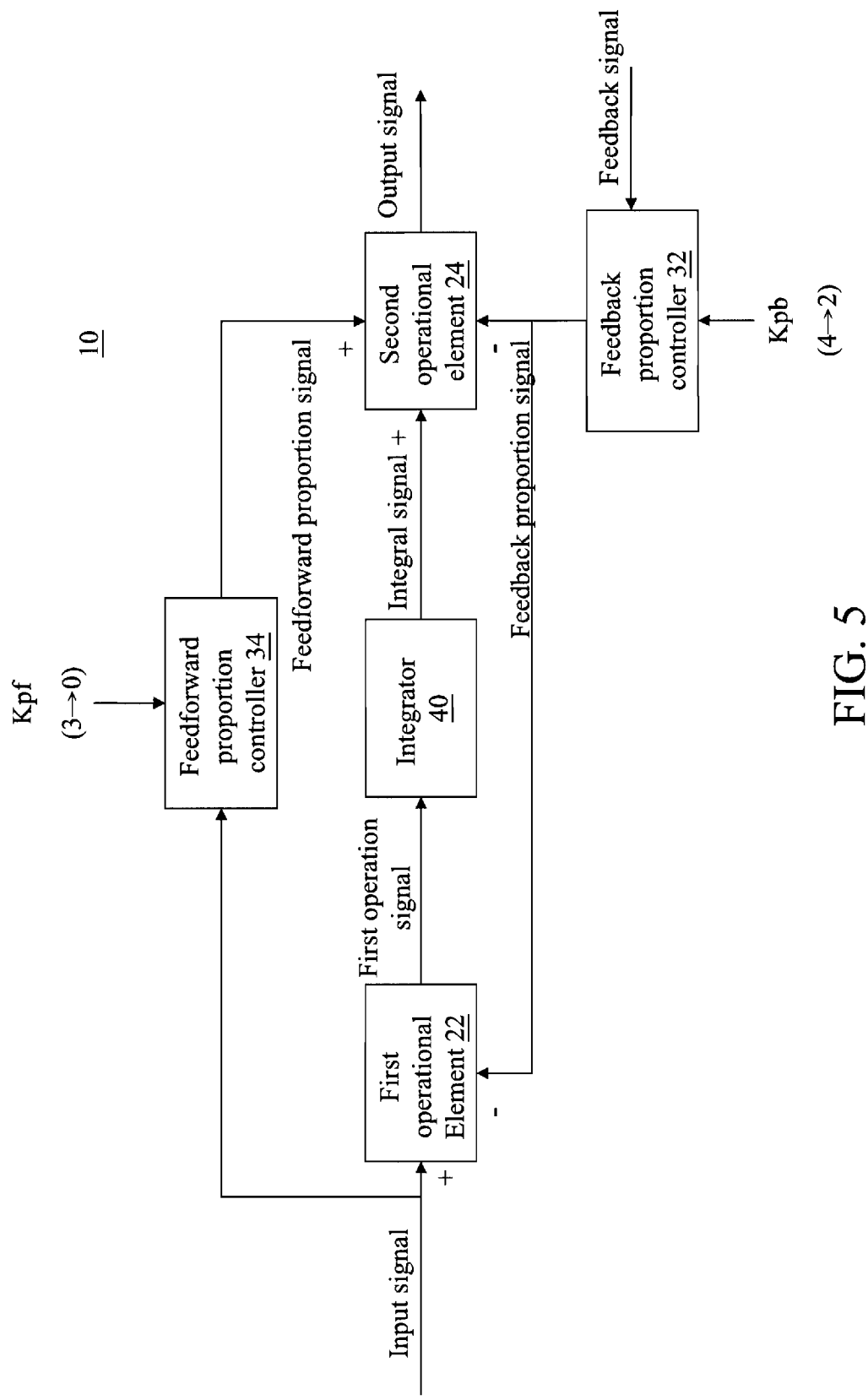
FIG. 5 is a block diagram of a system according to a fourth embodiment of the present invention.

Referring to FIG. 5, it is a block diagram of a system according to a fourth embodiment of the present invention. For example, in this embodiment, the first feedback gain is "4", the second feedback gain is "2", the first feedforward gain is "3", and the second feedforward gain is "0". That is to say, the first feedback gain is not equal to the first feedforward gain, and the second feedforward gain is equal to "0". When the gain Kpb is "4" (the first feedback gain) and the gain Kpf is "3" (the first feedforward gain), the control system 10 may perform the PDFF control. When the Kpb is "2" (the second feedback gain) and the gain Kpf is "0" (the second feedforward gain), the feedback signal is not input to the first operational element 22 and the second operational element 24, so the control system 10 may perform the PDF control. Based on the foregoing descriptions, the gain Kpb and gain Kpf may be switched by the first multiplexer 51 and the second multiplexer 52. Therefore, the control system 10 may be switched between the PDFF control and the PDF control.

Figure 6:
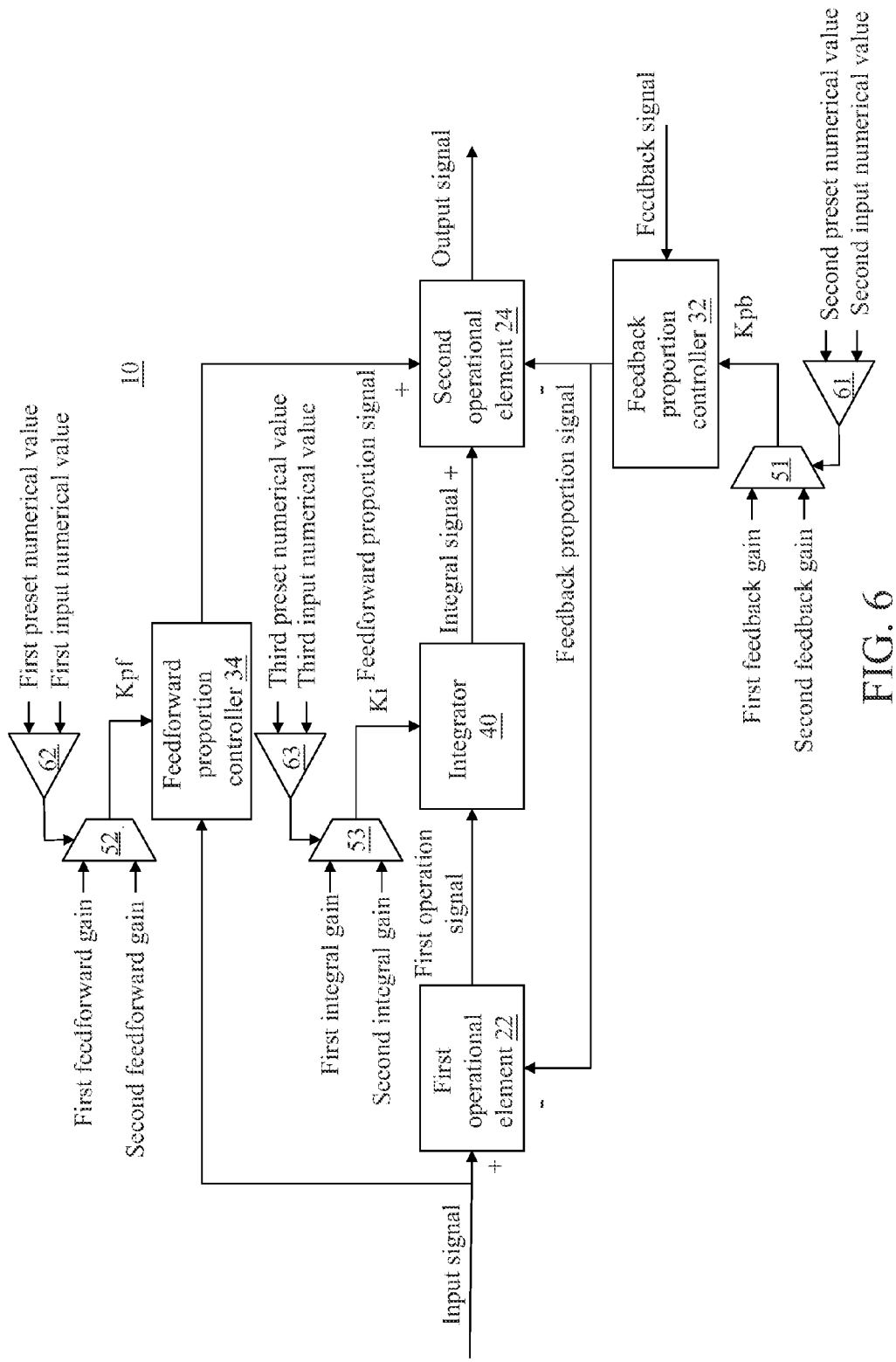
FIG. 6 is a block diagram of a system according to a fifth embodiment of the present invention.

Referring to FIG. 6, it is a block diagram of a system according to a fifth embodiment of the present invention.

Being similar to FIG. 1, the control system 10 comprises the first operational element 22, the second operational element 24, the feedback proportion controller 32, the feedforward proportion controller 34, and the integrator 40.

The integrator 40 is used to receive the first operation signal of the first operational element 22, perform the integral on the first operation signal, multiply an integral result by a gain Ki to generate an integral signal, and transmit the integral signal to the second operational element 24. The gain Ki may be selected from the first integral gain and the second integral gain.

The gain Ki received by the integrator 40 may be output by a third multiplexer 53. The third multiplexer 53 receives the first integral gain and the second integral gain, and selectively outputs one of the first integral gain and the second integral gain according to a third switching signal. The third switching signal is generated by a third comparator 63. The third comparator 63 generates the third switching signal according to a third preset numerical value and a third input numerical value. Furthermore, for example, when the third input numerical value is smaller than the third preset numerical value, the third comparator 63 outputs the third switching signal of a first type (for example, "logic 0") to the third multiplexer 53. The third multiplexer 53 outputs the first integral gain according to the third switching signal of the first type. When the third input numerical value is greater than the third preset numerical value, the third comparator 63 outputs the third switching signal of a second type (for example, "logic 1") to the third multiplexer 53. The third multiplexer 53 outputs the second integral gain according to the third switching signal of the second type.

When the first integral gain or the second integral gain is equal to "0", it represents that the signal does not pass through the integrator 40. Therefore, the control system 10 may be switched to a P control manner.

Figure 7:
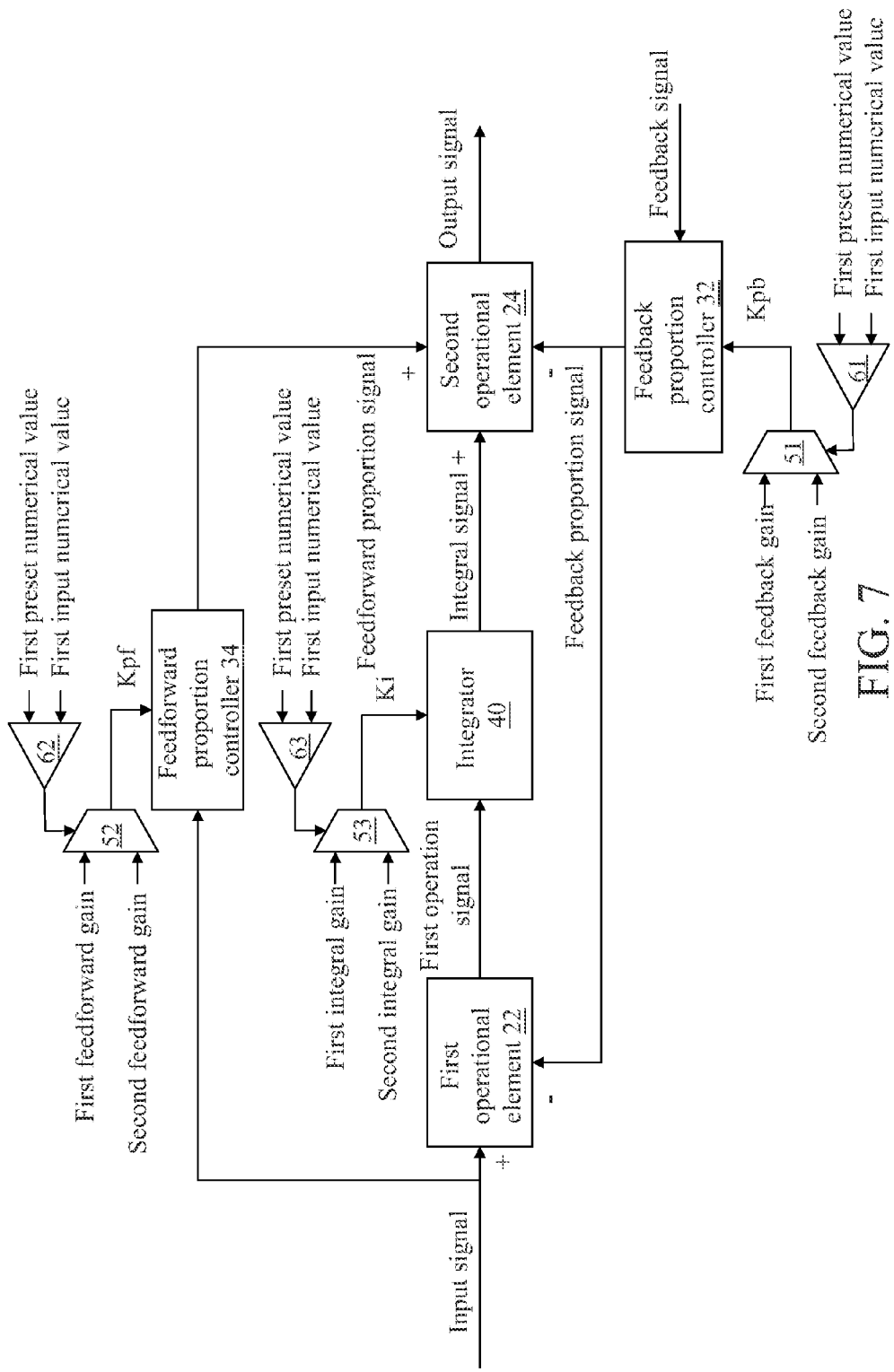
FIG. 7 is a block diagram of a system according to a sixth embodiment of the present invention.

Referring to FIG. 7, it is a block diagram of a system according to a sixth embodiment of the present invention. The first multiplexer 51, the second multiplexer 52, and the third multiplexer 53 may be respectively controlled by three comparators (the first comparator 61, the second comparator 62, and the third comparator 63), and may be controlled by the same comparator (the first comparator 61). That is to say, the first multiplexer 51, the second multiplexer 52, and the third multiplexer 53 can be switched at the same time. The first multiplexer 51, the second multiplexer 52, and the third multiplexer 53 may output the first feedforward gain, the first feedback gain, and the first integral gain at the same time or the second feedforward gain, the second feedback gain, and the second integral gain at the same time.

Figure 8:
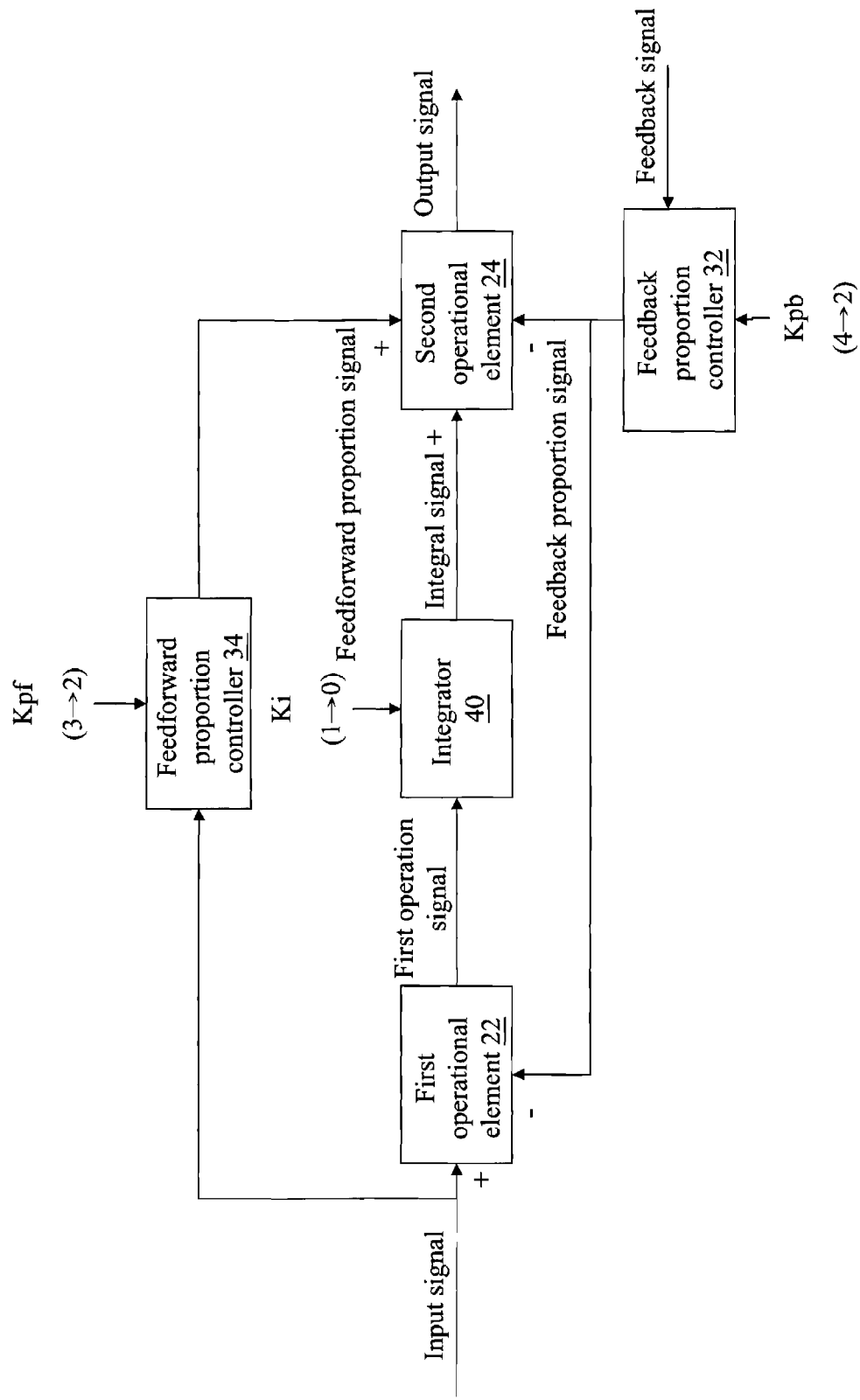
FIG. 8 is a block diagram of a system according to a seventh embodiment of the present invention.

Referring to FIG. 8, it is a block diagram of a system according to a seventh embodiment of the present invention. In this embodiment, the first feedback gain is not equal to the first feedforward gain, the second feedback gain is equal to the second feedforward gain, and the second integral gain is equal to 0. For example, the first feedback gain is "4", the second feedback gain is "2", the first feedforward gain is "3", the second feedforward gain is "2", a first integral gain is "1", and the second integral gain is "0".

When the gain Kpb is "4" (the first feedback gain), the gain Kpf is "3" (the first feedforward gain), and the gain Ki is "1" (the first integral gain), the control system 10 may perform the PDFF control. When the gain Kpb is "2" (the second feedback gain), the gain Kpf is "2" (the second feedforward gain), and the gain Ki is "0" (the second integral gain), the control system 10 may perform the P control. Based on the foregoing descriptions, the gain Kpb, gain Kpf, and gain Ki may be switched by the first multiplexer 51, the second multiplexer 52, and the third multiplexer 53. Therefore, the control system 10 may be switched between the PDFF control and PI control.

Figure 9:
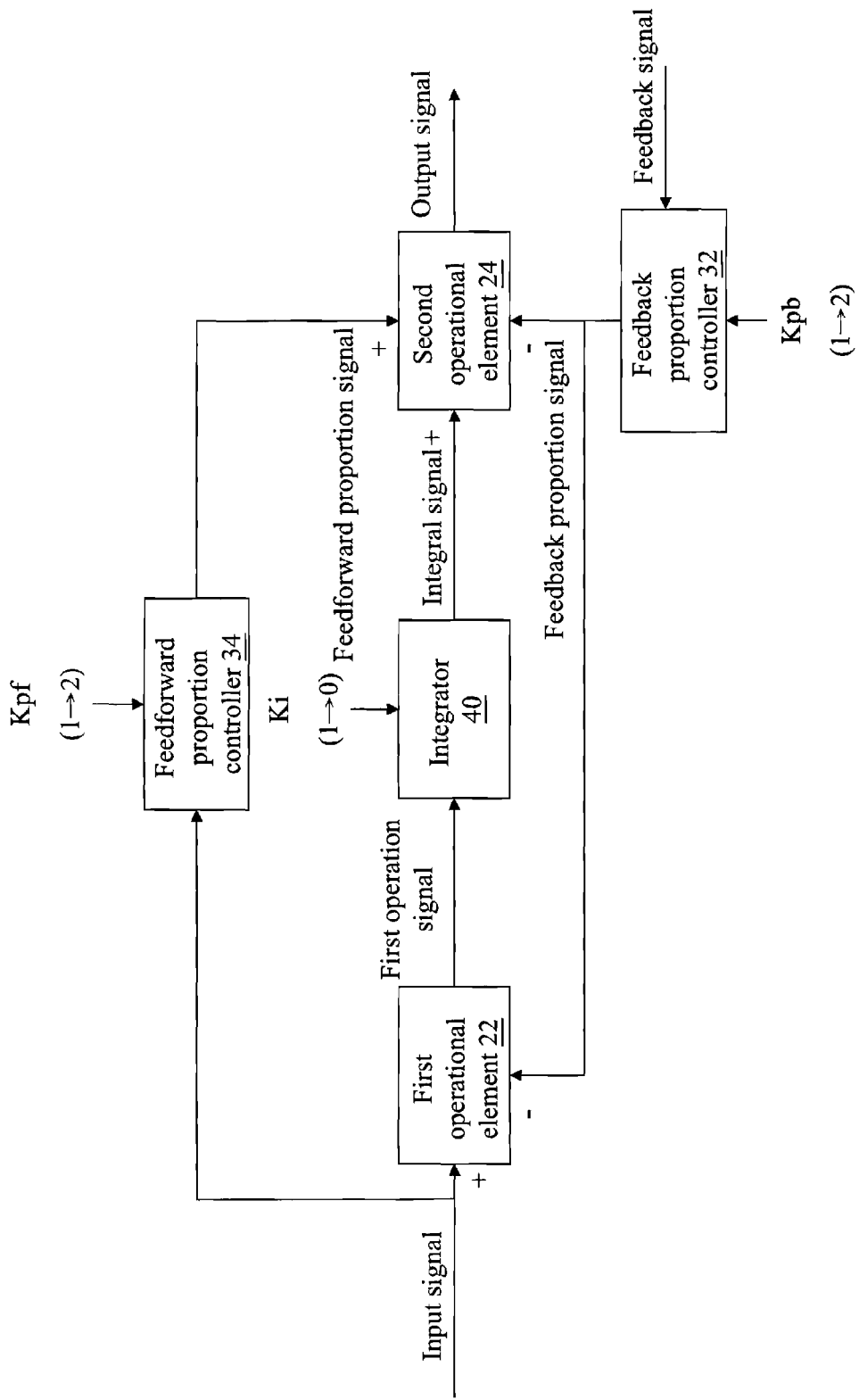
FIG. 9 is a block diagram of a system according to an eighth embodiment of the present invention.

Referring to FIG. 9, it is a block diagram of a system according to an eighth embodiment of the present invention. In this embodiment, the first feedback gain is equal to the first feedforward gain, the second feedback gain is equal to the second feedforward gain, and the second integral gain is equal to 0. For example, the first feedback gain is "1", the second feedback gain is "2", the first feedforward gain is "1", the second feedforward gain is "2", the first integral gain is "1", and the second integral gain is "0".

When the gain Kpb is "1" (the first feedback gain), the gain Kpf is "1" (the first feedforward gain), and the gain Ki is "1" (the first integral gain), the control system 10 may perform the PI control. When the gain Kpb is "2" (the second feedback gain), the gain Kpf is "2" (the second feedforward gain), and the gain Ki is "0" (the second integral gain), the control system 10 may perform the P control. Based on the foregoing descriptions, the gain Kpb, the gain Kpf, and the gain Ki may be switched by the first multiplexer 51, the second multiplexer 52, and the third multiplexer 53. Therefore, the control system 10 may be switched between the PDFF control and the PI control.

Figure 10:
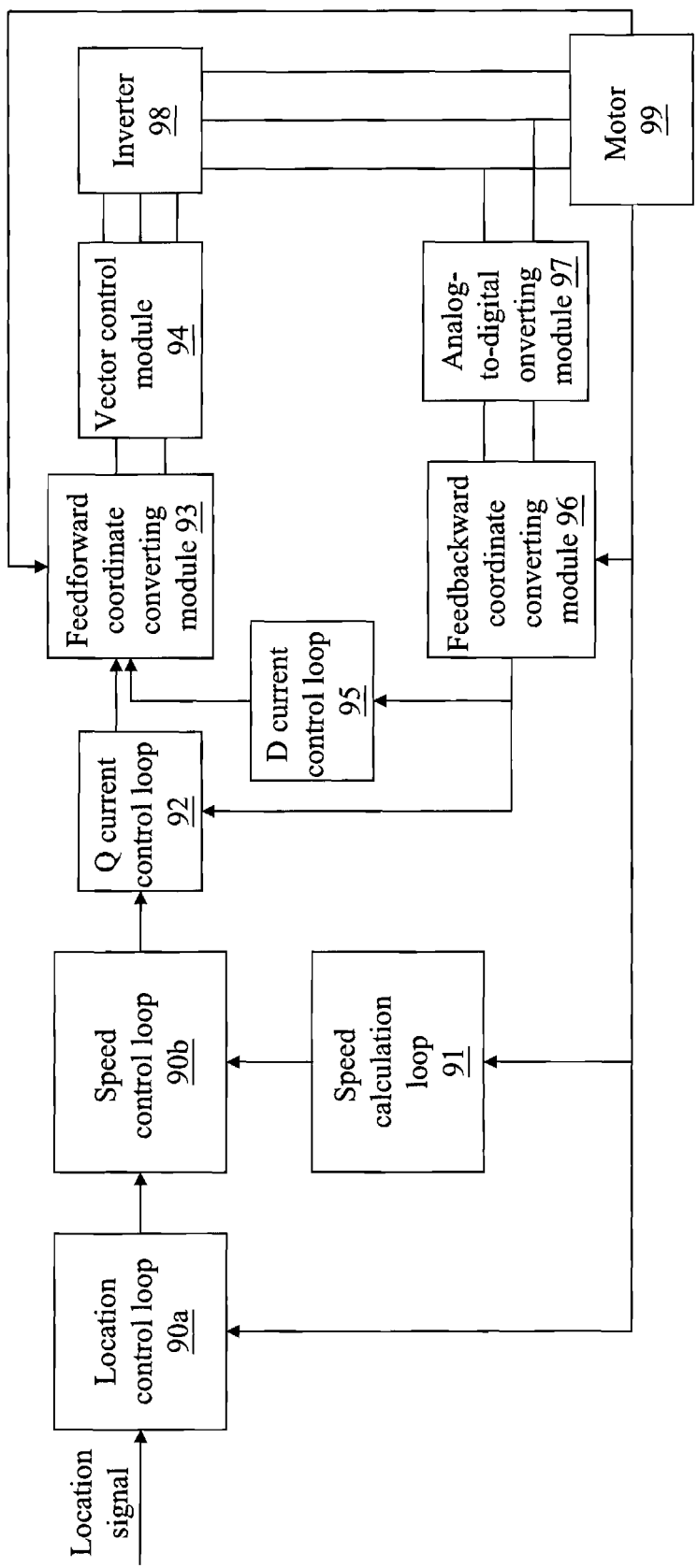
FIG. 10 shows an application of a control system according to the present invention.

Referring to FIG. 10, it is an application of a control system according to the present invention. The control system 10 of the present invention is used in a motor control module. The motor control module comprises a location control loop 90a, a speed control loop 90b, a speed calculation loop 91, a Q current control loop 92, a feedforward coordinate converting module 93, a vector control module 93, a D current control loop 95, a feedbackward coordinate converting module 96, an analog-to-digital converting module 97, an inverter 98, and a motor 99.

The speed control loop 90b is the control system 10 in FIG. 1, that is to say, the speed control loop 90b may be switched among different control manners. An input signal of the speed control loop 90b is a signal generated by the location control loop 90a. A feedback signal of the speed control loop 90b is a signal generated by the speed calculation loop 91. The speed control loop 90b outputs an output signal to the Q current control loop 92. The Q current control loop 92 and the D current control loop 95 generate a rotation torque value and a magnetic field value to the feedforward coordinate converting module 93. The feedforward coordinate converting module 93 outputs a signal to the inverter 98 through the vector control module 94. The inverter 98 outputs an Alternating Current (AC) signal to the motor 99 and the analog-to-digital converting module 97. The analog-to-digital converting module 97 generates a digital value to the feedbackward coordinate converting module 96. The feedbackward coordinate converting module 96 generates a feedbackward signal to the Q current control loop 92 and the D current control loop 95.

The control system 10 of the present invention may be automatically switched among different control methods (PDFF/PDF/PI/P), so as to provide a high-efficiency control manner.

What is claimed is:

1. A control system, for receiving an input signal and a feedback signal and generating an output signal, comprising:
    a first operational element, for receiving the input signal and the feedback proportion signal to generate a first operation signal;
    a feedback proportion controller, for receiving the feedback signal, and selectively generating the feedback proportion signal according to a first feedback gain or a second feedback gain;
    an integrator, for receiving the first operation signal and generating an integral signal;
    a feedforward proportion controller, for receiving the input signal, and selectively generating a feedforward proportion signal according to a first feedforward gain or a second feedforward gain;
    a second operational element, for receiving the feedforward proportion signal, the feedback proportion signal, and the integral signal, and generating the output signal different from the feedback signal; and
    a first multiplexer and a second multiplexer, wherein the first multiplexer selectively outputs the first feedback gain or the second feedback gain to the feedback proportion controller according to a first switching signal, and the second multiplexer selectively outputs the first feedforward gain or the second feedforward gain to the feedforward proportion controller according to a second switching signal;
    wherein the first feedback gain, the second feedback gain, the first feedforward gain and the second feedforward gain are set based on a control method selected from the group consisting of PI (Proportional Integral) type, PID (Proportional Integral Derivative) type, PDFF (Pseudo-Derivative Feedforward) type, PDF (Pseudo-Derivative Feedback) type or P (Proportional) type control methods.

2. The control system according to claim 1, wherein the first operational element performs subtraction on the input signal and the feedback proportion signal, so as to generate the first operation signal.

3. The control system according to claim 2, wherein the second operational element performs addition on the feedforward proportion signal and the integral signal to generate a result of the addition, and then performs subtraction on the result of the addition and the feedback proportion signal, so as to generate the output signal.

4. The control system according to claim 1, further comprising a first comparator and a second comparator, wherein the first comparator generates the first switching signal according to a first preset numerical value and a first input numerical value, and the second comparator generates the second switching signal according to a second preset numerical value and a second input numerical value.

5. The control system according to claim 4, wherein the first feedback gain is not equal to the first feedforward gain, and the second feedback gain is equal to the second feedforward gain.

6. The control system according to claim 4, wherein the first feedback gain is not equal to the first feedforward gain, and the second feedforward gain is equal to 0.

7. The control system according to claim 1, wherein the integrator generates the integral signal according to a first integral gain or a second integral gain.

8. The control system according to claim 7, further comprising a first multiplexer, a second multiplexer, and a third multiplexer, wherein the first multiplexer selectively outputs the first feedback gain or the second feedback gain to the feedback proportion controller according to a first switching signal, the second multiplexer selectively outputs the first feedforward gain or the second feedforward gain to the feedforward proportion controller according to a second switching signal, and the third multiplexer selectively outputs the first integral gain or the second integral gain to the integrator according to a third switching signal.

9. The control system according to claim 8, further comprising a first comparator, a second comparator, and a third comparator, wherein the first comparator generates the first switching signal according to a first preset numerical value and a first output numerical value, the second comparator generates the second switching signal according to a second preset numerical value and a second input numerical value, and the third comparator generates the third switching signal according to a third preset numerical value and a third input numerical value.

10. The control system according to claim 8, further comprising a first comparator, wherein the first comparator generates the first switching signal, the second switching signal, and the third switching signal according to a first preset numerical value and a first input numerical value.

11. The control system according to claim 8, wherein the first feedback gain is not equal to the first feedforward gain, the second feedback gain is equal to the second feedforward gain, and the second integral gain is equal to 0.

12. The control system according to claim 8, wherein the first feedback gain is equal to the first feedforward gain, the second feedback gain is equal to the second feedforward gain, and the second integral gain is equal to 0.

* * * * *